Aug. 15, 1950 — V. C. WILSON — 2,519,007
RADIATION COUNTER
Filed Jan. 24, 1949 — 2 Sheets-Sheet 1

INVENTOR.
Volney C. Wilson
BY
Roland A. Anderson
Attorney

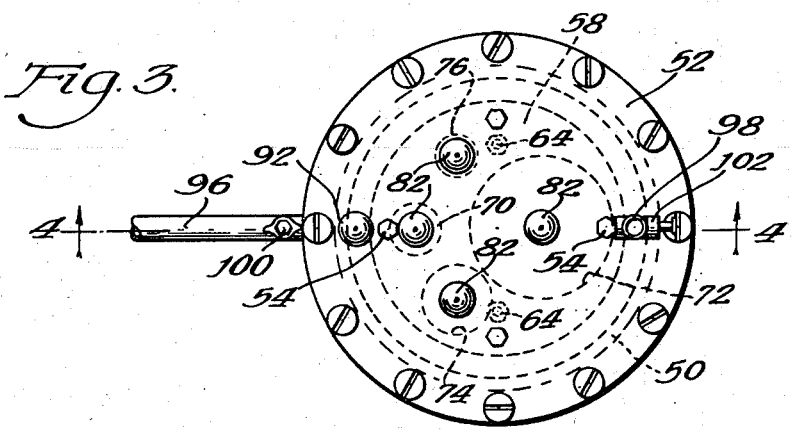
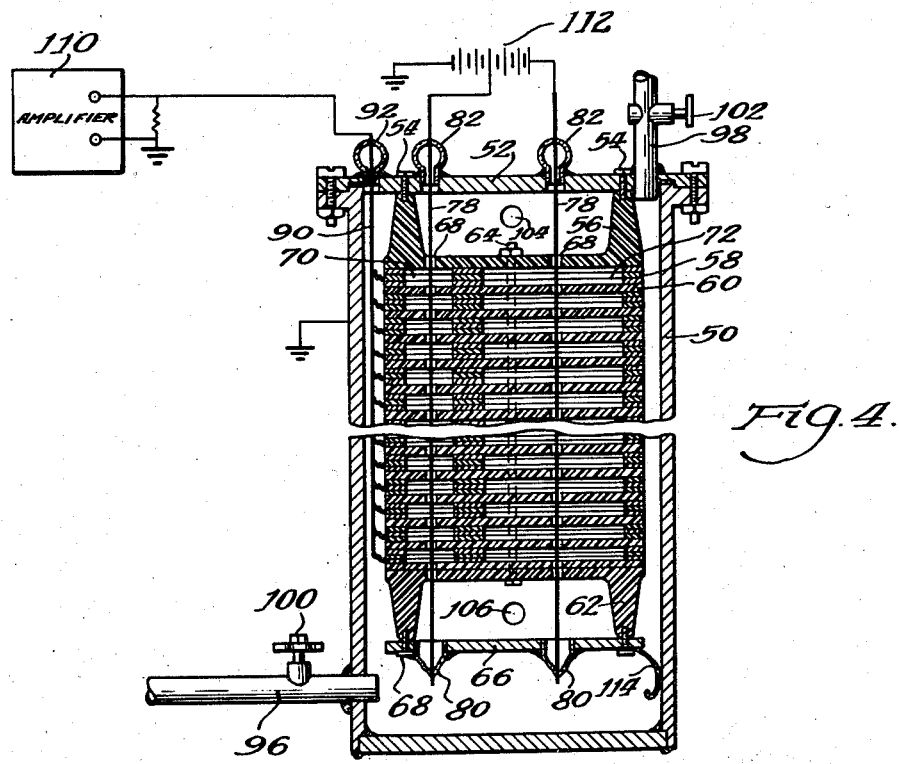

Patented Aug. 15, 1950

2,519,007

UNITED STATES PATENT OFFICE 2,519,007

RADIATION COUNTER

Volney C. Wilson, Schenectady, N. Y., assignor to the United States of America as represented by the United States Atomic Energy Commission Application January 24, 1949, Serial No. 72,423

12 Claims. (Cl. 250—27.5)

This invention relates to an improvement in radiation counters. More specifically, the invention is concerned with improving the sensitivity of pulse ionization chambers for detecting and measuring radiation. The invention is particularly useful in instruments for the detection and measurement of fast neutron flux but some aspects thereof may readily be employed in the detection and measurement of other types of radiation, including gamma rays and charged nuclear particles.

In detecting neutrons with an ionization chamber, it is common to include in the structure a substance which produces ionizing radiations upon the impingement of neutrons, which are in themselves non-ionizing. In this manner ionization is produced within the ionization chamber by the secondary charged particles so produced and the neutron flux is thus indirectly detected and measured, either by measurement of the total or integrated current, or by counting of the ionization pulses so produced. Fast neutron flux is frequently measured by the use of a hydrogenous substance within the ionization chamber. The fast neutrons produce proton recoils upon collision with the hydrogen nuclei and ionization within the chamber is produced by the recoil protons. One form in which the hydrogen is incorporated in the chamber is as a gas. However, the density of a gas is so low that the size of the chamber must be prohibitive in order that fast neutrons impinging on the chamber have a high probability of striking a hydrogen nucleus to produce a recoil proton before the neutron completely traverses the chamber. Raising the density of the gas by employing high gas pressures, and increasing the size of the chamber to produce high efficiency of detection result in a requirement of extremely high voltages. If the hydrogen is incorporated in a solid form, such as a body of paraffin, the solid body must be extremely thin in order that the charged particles produced be able to enter the ionization region before "self-absorption" in the solid hydrogenous mass.

The present invention provides a counter for fast neutrons wherein the above-described difficulties are overcome and the sensitivity of the counter for the detection of fast neutrons is greatly increased over that heretofore attainable without appreciably increasing the interelectrode capacities or altering the electric field gradient between the electrodes. In addition, there is provided by the invention a novel type of neutron counter having a plurality of electrode pairs with varying spacings, the counter thus constituting a simply-fabricated and compact multiple counter. Although the preferred embodiments of the invention to be described hereinafter are fast neutron counters, it will be seen that many of the teachings of the invention may be readily adapted to radiation counters for other nuclear particles.

For understanding of the invention, reference is made to the embodiments illustrated in the drawing in which:

Figure 3 is a plan view of a multiple neutron counter embodying the teachings of the invention; and Figure 4 is a central vertical sectional view of the counter of Figure 3 together with an elementary schematic diagram of the electrical circuit associated therewith.

Figure 1:
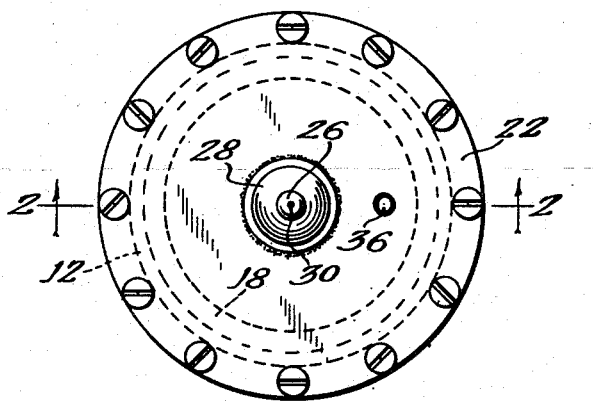
Figure 1 is a plan view of a neutron counter embodying the invention.
Figure 2:
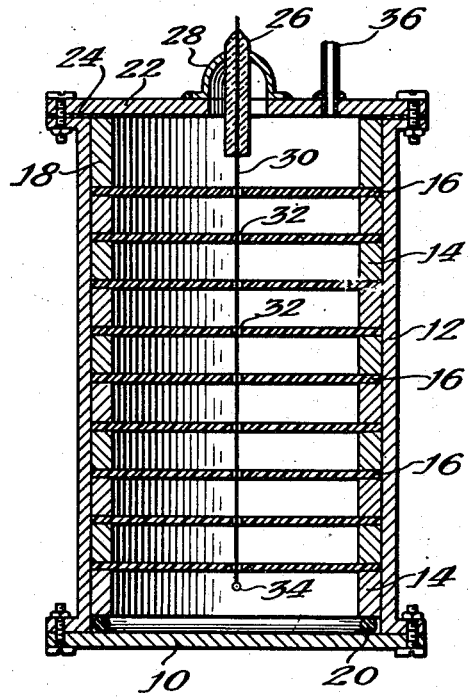
Figure 2 is a central vertical sectional view of the counter of Figure 1 as indicated by the numerals 2—2 in the latter figure.

In the counter of Figs. 1 and 2, a base plate 10 is bolted to a tubular housing 12. Slidingly fitted into the housing 12 are annular rings 14 and circular hydrogenous discs or wafers 16, the rings 14 and discs 16 being inserted alternately. The discs 16 may be, for example, of polyethylene, polystyrene, paraffin, or other solids having at least about 40 atomic percent hydrogen (herein called hydrogenous materials), polyethylene being preferred. Resting on the uppermost disc 16 is an additional annular ring 18, and below the lowest ring 14 upon the base plate 10 is an annular rubber gasket 20. A top plate 22 is bolted to the housing 12 with an interposed gasket 24. The bolting of the plate 22 to the housing 12 presses downward upon the assembly of rings 14 and 18 and discs 16 to compress the gaskets 20 and 24, thus rendering the structure pressure-tight. Centrally of the top plate 22 is a glass-to-metal seal consisting of a central glass insulator 26 secured to the top plate 22 by the soldering of a metal flange 28 to the top plate 22. Through the insulator 26 extends a tungsten wire 30 of, for example, 5 mils diameter. The wire 30 extends down through central apertures 32 in the disc 16, the lower end of the wire 30 being near, but not touching, the base plate 10. At the lower end of the wire 30 is a small glass bead or ball 34 to exercise tension on the wire and thus maintain a straightness of the wire, and to prevent point discharges which might occur if the end of the wire were left free. The top plate 22 is provided with a gas passage tube 36 through which the chamber may be evacuated and filled with a suitable counter gas, such as argon at a pressure of 1 to 3 atmospheres.

It will be seen that the wire 30 constitutes the center wire electrode of the ionization chamber or counter, and the rings 14, which are in contact with the housing 12, constitute an outer cylindrical electrode surrounding the axial center electrode 30. Upon exposure of the illustrated structure to fast neutrons, protons are emitted from the hydrogenous wafers or discs 16 into the considerable number of ionization regions into which the chamber is divided by the discs 16. In this manner, the discs 16 may be made sufficiently thin to avoid any substantial problem of self-absorption, i. e., sufficiently thin so that the number of protons generated in the hydrogenous material which will be absorbed therein before entering the gaseous ionizing medium of the chamber will be negligible. By thus reducing the amount of hydrogen present, the problem of self-absorption is avoided without reducing the sensitivity of the counter.

In Figures 3 and 4 is shown a modified form of the invention. In the counter of these figures, the cup-shaped housing 50 has a top plate 52 bolted thereto. Suspended from the top plate 52 by screws 54 is a cup-shaped polystyrene insulator 56. Beneath the polystyrene insulator 56 is a laminated assembly consisting of alternate laminations comprising three discs 58 of brass and one disc 60 of polystyrene or polyethylene. Below this laminated structure of three-fold brass discs 58 and single hydrogenous discs 60 is an inverted cup-shaped polystyrene insulator 62, which is fastened to the upper cup-shaped insulator 56 by tie-bolts or rods 64, the tie-bolts or rods 64 thus securing the laminated assembly described above.

A plate 66 is secured by screws 68 to the lower insulator 62. The hydrogenous discs 60 and the insulators 56 and 62 have aligned spaced apertures 68 therein. The brass discs 58 likewise have aligned spaced apertures 70, 72, 74 and 76, but the latter apertures are of various sizes, all of said last-mentioned apertures being larger than the apertures 68, the apertures 68 being axial of the respective circular apertures 70, 72, 74 and 76. Through the apertures 68, and thus centrally of the apertures 70, 72, 74, and 76, are tungsten wires 78 which are secured at their bottom ends to the plate 66 by insulating glass-to-metal seals 80 and which extend through insulating glass-to-metal seals 82 in the top plate 52.

It will be seen that there is thus provided a multiple counter whereof the wires 78 constitute the central electrodes of the various electrode pairs and the apertured brass discs 58 constitute the outer cylindrical electrodes of all four of the electrode pairs, the size of each of the four counter elements being determined by the size of the respective aligned apertures 70, 72, 74, and 76. Each three-fold brass lamination 58 is electrically connected to a rod 90 which hangs downward from the base plate 52, supported by an additional insulating metal-to-glass seal 92.

The chamber is provided with separate gas intake and outlet tubes 96 and 98 and valves 100 and 102. The upper and lower insulators 56 and 62 are apertured at 104 and 106 to permit gas flow through the ionization region of the four two-electrode counter structures.

In the illustrative electrical circuit illustrated in Fig. 4, the center wire electrodes 78 of the two-electrode structures are connected to respective positive terminals of a power supply 112, and the signals from the common collecting electrode consisting of discs 58 are fed to a common amplifier 110. The negative terminal of the voltage supply 112 is grounded as is the housing 50. It will be seen that the housing 50 thus serves as a guard-ring preventing the transmission to the amplifier 110 of spurious signals caused by insulator leakage across the glass-to-metal seals or the insulators. To this end, the bottom plate 66 is likewise grounded to the housing 50 by a spring contact 114 secured to the bottom plate 66 by one of the screws 68.

Persons skilled in the art will readily adapt many of the teachings of the invention to use in radiation counters far different both in appearance and in other respects from those illustrated in the drawing and described above. Likewise many equivalents of the structure herein described which utilize the teachings of the invention will be devised by such persons. Many such equivalents will be obvious upon mere inspection and understanding of the embodiment described. Others less obvious will likewise be devised upon reflection and study of the essence of the teachings of the invention. Accordingly, the scope of the invention should not be limited by either the precise structure or the appearance of the embodiments of the invention herein illustrated, but should be extended to cover the essence of the teachings of the invention as described in the claims hereto appended.

What is claimed is:

1. A fast neutron counter comprising spaced electrodes and a plurality of hydrogenous wafers dividing the space between said electrodes into a plurality of ionization regions.

2. A fast neutron counter comprising an ionization chamber having concentric cylindrical electrodes defining an elongated annular ionization region and a plurality of longitudinally spaced annular hydrogenous wafers in said ionization region.

3. A fast neutron counter comprising an ionization chamber having elongated electrode surfaces and a plurality of spaced parallel hydrogenous wafers extending between said electrode surfaces in a plane normal thereto.

4. A fast neutron counter comprising an ionization chamber having spaced electrodes and a plurality of spaced hydrogenous wafers in said chamber disposed in planes connecting said electrodes.

5. A fast neutron counter comprising at least two spaced electrodes and at least three hydrogenous wafers dividing the space between two of the electrodes into a plurality of ionization regions bounded by at least two electrodes and at least two hydrogenous wafers.

6. In a radiation counter having a plurality of spaced electrodes defining an interelectrode space and having therein a substance adapted to produce ionization in said interelectrode space upon impingement of nuclear radiations thereupon, the improved construction wherein said substance is in the form of wafers dividing the interelectrode space into a plurality of ionization regions.

7. A neutron counter comprising a tubular conducting wall electrode, a center wire electrode disposed axially of the wall electrode, and a plurality of longitudinally spaced parallel wafers of solid hydrogenous material within the tubular electrode.

8. A neutron counter comprising a wall electrode, a center wire electrode disposed axially of the wall electrode, and a plurality of longitudinally spaced parallel wafers of solid hydrogenous material dividing the interelectrode space into a plurality of ionization regions.

9. A multiple neutron counter comprising a laminated assembly of conducting discs and hydrogenous wafers, the conducting discs having aligned apertures therethrough, and conducting wires extending through said assembly axially of each of said apertures.

10. A multiple radiation counter comprising a laminated assembly of conducting discs and wafers of a substance emitting ionizing particles upon exposure to radiation, the conducting discs having aligned apertures therethrough, and conducting wires extending through said assembly axially of each of said apertures.

11. A fast neutron counter which has hydrogenous surfaces of greater surface area than the electrode surfaces within the interelectrode space thereof to provide large proton recoil surfaces without appreciably increasing the interelectrode capacities or altering the electric field gradient between the electrodes.

12. A fast neutron counter comprising spaced electrodes and bodies of hydrogenous solid insulating material having a dielectric constant approximately equal to unity and having a surface area greater than the surface area of the electrodes, in the space between the electrodes, whereby there are provided large proton recoil surfaces without appreciably increasing the interelectrode capacity or altering the electrode field gradient between the electrodes.

VOLNEY C. WILSON.

REFERENCES CITED

The following references are of record in the file of this patent:

UNITED STATES PATENTS

| Number | Name | Date |
|---|---|---|
| 2,289,984 | Mouromtseff et al. | July 14, 1942 |
| 2,397,071 | Hare | Mar. 19, 1946 |
| 2,462,471 | Crumrine | Feb. 22, 1949 |

OTHER REFERENCES

Cuykendall, Review of Scientific Instruments, Dec. 1933, pages 676–678.

Richtmeyer and Kennard: Introduction to Modern Physics, McGraw-Hill Book Co., 1947, p. 577.